March 1, 1966  B. BERNSTEIN  3,238,426

CASING FOR SERIES CONNECTED RECTIFIER ASSEMBLY

Filed June 8, 1962

INVENTOR.
BERNARD BERNSTEIN
BY James and Franklin
ATTORNEYS

March 1, 1966     B. BERNSTEIN     3,238,426
CASING FOR SERIES CONNECTED RECTIFIER ASSEMBLY
Filed June 8, 1962     2 Sheets-Sheet 2
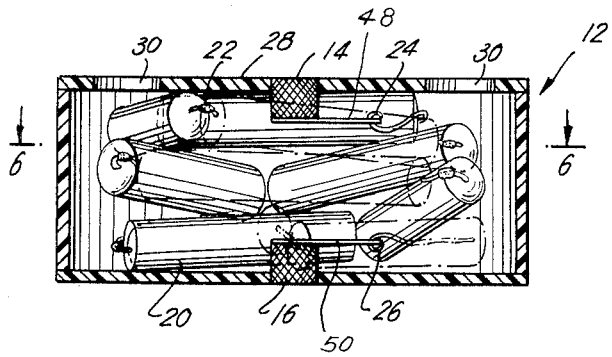
FIG. 5
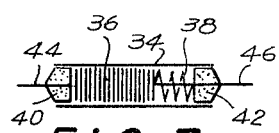
FIG. 7
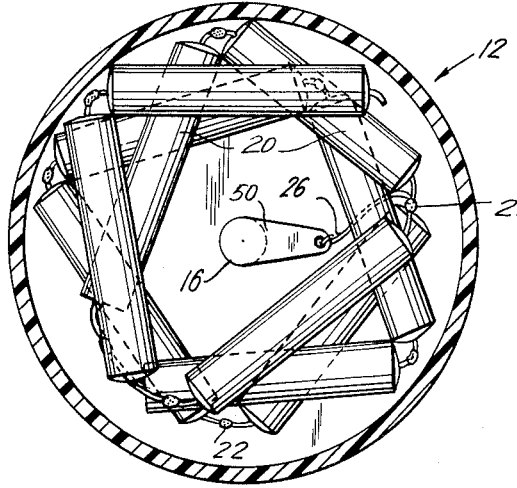
FIG. 6
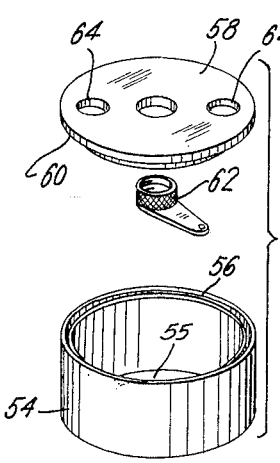
FIG. 9
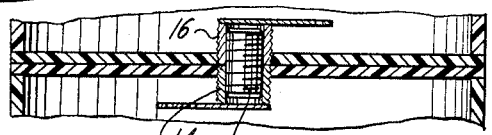
FIG. 8
FIG. 10
INVENTOR.
BERNARD BERNSTEIN
BY
ATTORNEYS

United States Patent Office 3,238,426
Patented Mar. 1, 1966

3,238,426
CASING FOR SERIES CONNECTED RECTIFIER
ASSEMBLY
Bernard Bernstein, Brooklyn, N.Y., assignor to General
Instrument Corporation, Newark, N.J., a corporation
of New Jersey
Filed June 8, 1962, Ser. No. 201,128
16 Claims. (Cl. 317—234)

This invention relates to high voltage rectifiers, and more particularly to such rectifiers using a series chain of selenium rectifiers of the cartridge type.

There has been expanded use of and greater demand for a selenium rectifier in high voltage applications, in some instances as high as 1,000,000 volts, but more often in values of 100,000 volts to 200,000 volts. For such use the older forms are unwieldly and cumbersome. Also as the voltages become higher it is more difficult to make assemblies which are free of corona. For other rectifiers, for example tubes, even moderately high voltages, say 150,000 volts, require complicated and expensive circuitry for series connection. On the other hand silicon rectifiers involve careful grading, as well as cell protection against uneven voltage distribution, and current overload.

The general object of the invention is to improve high voltage rectifiers. More particular objects are to provide a high voltage rectifier which is simple, sturdy, reliable, long-lived, and yet which may be manufactured at low cost.

A further object is to provide a rectifier which is conveniently packaged in modules which are easily stacked in different numbers to meet varied requirements.

To accomplish the foregoing general objects, and other more specific objects which will hereinafter appear, my invention resides in the high voltage rectifier assembly and the elements thereof and their relation one to another, as are hereinafter more particularly described in the following specification. The specification is accompanied by drawings in which:

FIG. 5 is a section through a module taken approximately in the plane of the line 5—5 of FIG. 1;

FIG. 6 is a horizontal view taken approximately in the plane of the line 6—6 of FIG. 1;

FIG. 7 is a diagramamtic view of the interior of one of the cartridges;

FIG. 8 is a fragmentary section showing how a short threaded stud is employed to assemble adjacent pucks;

FIG. 9 is a perspective view showing a modified casing for the puck; and

FIG. 10 is a fragmentary section like FIG. 8, but showing a modified insert which may be used to assemble adjacent pucks.

Figure 1:
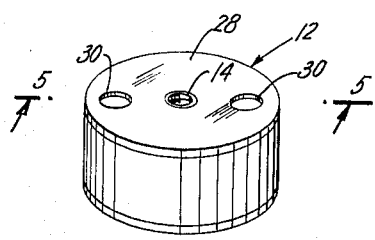
FIG. 1 is a perspective view showing one of the puck-shaped modules characteristic of the invention.

Referring to the drawing, and more particularly to FIGS. 1, 4, 5 and 6, the rectifier module comprises a hollow puck-shaped insulation casing 12 having a terminal 14 in one end and another terminal 16 in the other end. This contains and protectively houses a series chain of rectifiers 20 which are electrically and physically connected by bendable connections indicated at 22. The chain is coiled to form a helix which is received in the casing 12, and one end of the chain is connected to its adjacent terminal, as shown at 24 in FIG. 5. The other end of the chain is connected to its adjacent terminal 16, as shown at 26 in FIGS. 5 and 6. The case is preferably filled with potting material, and the top end 28 of the case may have holes 30 to facilitate the filling operation.

The terminals or inserts 14 and 16 are preferably internally threaded and are preferably mounted flush with the outer flat face of the end of the puck. The pucks then may be stacked and connected both physically and electrically by means of short threaded studs, and FIG. 8 shows how a stud 32 may be received in two adjacent inserts 14 and 16 to hold adjacent pucks in face-to-face relation. Similar short threaded studs may be used at the ends of the stack to receive nuts for holding terminal wires and anticorona hardware, such as a dome or toroid.

The rectifiers 20 are selenium rectifiers of a known type. One of these is schematically shown in FIG. 7, it comprising an insulation tube 34 containing a series stack of thin circular selenium cells 36 which are disposed in face-to-back relation. The cartridge preferably includes a compression spring 38 to hold the cells in good contact. The ends may be plugged in suitable fashion as by means of epoxy insulation material, indicated at 40 and 42, with lead wires 44 and 46 projecting therefrom. It is common to differently color the insulation at 40 and 42 to distinguish the positive and negative ends. A single cartridge may handle a voltage of, say 2000 volts. These cartridges are connected electrically in series to form a chain for handling a higher voltage, and in the present case ten such cartridges are connected end to end for a voltage of 20,000. The leads 44 and 46 are bendable, and thus the chain is easily wound into the desired helical formation here shown. Each puck then handles a voltage of 20,000, and five such pucks may be stacked to operate at 100,000 volts.

In preferred form the length of the cartridges is so related to the diameter of the coil that the connections between cartridges in the successive coils of the helix are offset from one another. This will be apparent from inspection of FIG. 6, and it will be evident that the displacement of the connections minimizes the likelihood of voltage breakdown.

Figure 4:
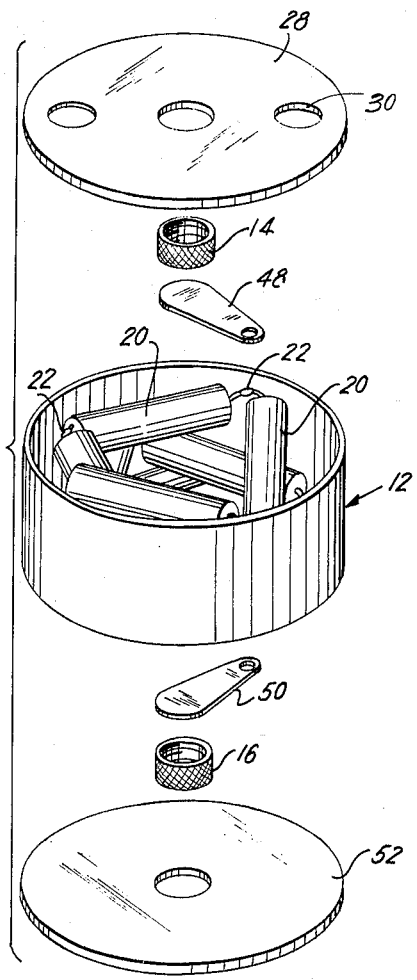
FIG. 4 is a perspective view showing the parts of a module in disassembled relation.

Referring to FIG. 4, the casing 12 is made of a short length of insulation tubing and two flat circular ends. The material may be a so-called "paper phenolic." The metal terminal 14 is secured to a metal soldering lug 48, as by spot welding, and the same applies to the terminal 16 and its soldering lug 50. The assembled terminal may be secured in the board 52, as by means of an epoxy cement, and the exterior of terminal 16 is preferably knurled to strengthen the connection. The terminal 14 is similarly made and is secured in the top 28 in the same manner. The cylindrical part 12 is cemented to the ends 28 and 52.

If the device is to be manufactured in large enough quantities to warrant the building of a mold, the case may be made in a different fashion illustrated in FIG. 9. Here the case consists of only two parts, one being a cup-shaped part having a cylindrical wall 54 and a bottom 55 which are molded integrally. The wall 54 has a stepped periphery at 56. The other part is a flat top 58 which has a stepped periphery at 60 to mate with the part 56. The upper terminal 62 may be made as before, and there is a similar terminal at the bottom. As before, after electrically connecting the ends of the chain to the terminals, the top 58 is cemented to the body 54 and the device is filled with potting material, preferably an epoxy insulation, through the holes 64.

This module is designed for high voltage assemblies, and certain high voltage practices should be followed. Because of the differences in the dielectric properties of air and the case, it is good practice to incorporate a grading toroid between modules when the stack is operated in air at voltages in excess of 60,000 volts PRV. Terminating toroids of larger diameter also may be used at the ends of the stack.

Figure 2:
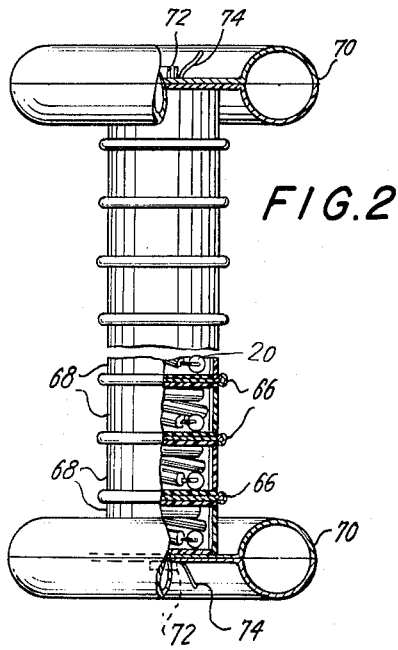
FIG. 2 is a partially sectioned elevation of a stack of such modules provided with anticorona rings.

FIG. 2 illustrates the use of metal toroids for anticorona protection. In this case there are small metal grading toroids 66 disposed between successive pucks 68, and larger diameter toroids 70 at the ends of the stack. The large toroids may be made of two oppositely convexed pieces of sheet metal, and the smaller ones may be made of a single piece of sheet metal with a rolled peripheral edge. However, other constructions may be employed. The stack shown in FIG. 2 is broken away at the center to indicate that a larger number of pucks is used, operating at a high voltage necessitating the anticorona precaution. The pucks are held together by short threaded studs, as shown in FIG. 8, and similar studs at the ends receive nuts 72 which hold the toroids 70 in position and which also receive leads 74.

When operating under oil, it is not essential that grading or terminating toroids be used. However, it is good practice to cap the ends with small spheres, cap nuts, etc., so as to reduce the stress. The major advantage gained in oil operation is the overall reduction in equipment size, as well as the ability to operate at higher currents.

Figure 3:
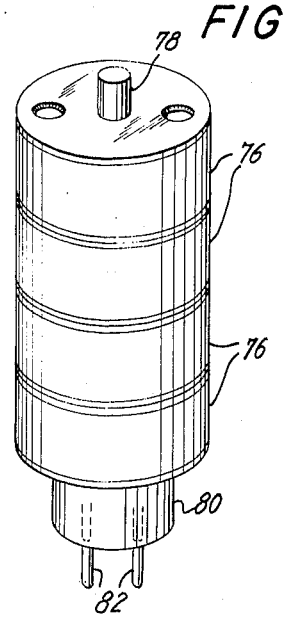
FIG. 3 is a perspective view showing a stacked assembly arranged for replacement of a vacuum tube.

FIG. 3 illustrates how a stack of pucks may be used to form a rectifier designed to replace a high voltage rectifier tube. This is for use in a chassis having a vacuum tube socket. It is a simple matter to fit a required tube base to an assembly of modules. It is well known that tubes frequently are not used to their maximum current and/or voltage ratings, and where proper conditions exist, a simple field replacement may be made with minimum or no circuit changes.

The device comprises a desired number of modules 76 terminating in a metal cap 78 at one end, dimensioned like a vacuum tube cap. It also has a base 80 with prongs 82 dimensioned like a vacuum tube base, although only one prong is actually employed for electrical connection, there being no need for a filament supply as in a vacuum tube. The parts 78 and 80 may be secured to threaded studs for electrical and mechanical connection to the stack, and the pucks are themselves secured together by threaded studs, as previously described.

Although I prefer to use internally threaded terminals at both ends of the puck, as so far described, it will be understood that, if desired, the puck may be given a male terminal at one end and a female terminal at the other end. This is illustrated in FIG. 10, in which the end 84 of module 86 has a female terminal 88 like that previously described, and the end 90 of module 92 has a male terminal 94 with a threaded projection or stud 96. With this arrangement the puck 86 has a male terminal at its other end, and the puck 92 has a female terminal at its other end. The pucks are then screwed together, without the need for a separate threaded stud. At the ends of a stack of pucks one end has its male stud to receive a nut and anticorona hardware. The other end has a female terminal which then is given a short threaded stud, which in turn receives a nut for anticorona hardware when such hardware is to be used. The end studs may receive other elements such as the tube cap and base shown in FIG. 3.

To make a puck the following procedure may be used. Press edge of insert into hole and apply epoxy cement around insert to bond it to the cover and bottom. Apply epoxy cement around inside of tube and against bottom, to seal them together all around. Prepare cartridge rectifier string, making sure that negative end of one cartridge is soldered to positive end of adjacent cartridge. Connect negative end of cartridge string to solder terminal-insert in the bottom of the shell. Then spiral wind the cartridge string into the shell. Finally solder the positive end of cartridge string to a cover terminal. Using one of the two pouring holes, pour epoxy potting mix through hole in cover.

In the particular case here shown the pucks have a diameter of 2½ inches. The height depends on the diameter of the cartridge used. I have made this device in heights ranging from one inch to two inches, depending on the current carrying capacity of the rectifier. In a typical case a single cartridge may be rated at, say 2000 volts and four milliamperes, and a chain of ten such cartridges may have a feed current which is somewhat less, say three milliamperes. The puck then is one inch high. For a higher feed current the cartridge employed would be larger in diameter, and then the puck would be correspondingly higher. Also I have used nine higher voltage cartridges, rated at 3400 volts each, for a 30,000 volt puck, having a diameter of 2½ inches and a height of 1½ inches.

Experience has shown that selenium rectifiers can, for a period of milliseconds, carry ten times rated current, and five times rated current for a considerably longer period if the repetition rate is correspondingly limited. In this connection it should be noted that the relatively high forward voltage drop of a selenium rectifier acts as a limiting impedance during current surges. This supposedly detrimental characteristic may be used to advantage in that there is an inherent current limiting action which is self protecting. For instance, a selenium rectifier used as a plate supply to an X-ray tube will protect the X-ray tube from surge damage. For the foregoing reasons these rectifiers may be employed in circuits with high capacities as well as in cases where the loads are expected to spark, as for instance in accelerators, electrostatic paint sprayers, etc., with no apprehension regarding their ability to withstand such transients.

The new unit offers many advantages. It is rugged and has long life. It requires no special provision for voltage distribution, and can withstand high current surges. It is simpler than tubes, and needs no filament transformer. It is instantly operable, and impervious to mechanical shock. It can handle very high voltage. It has excellent high voltage geometry. It lends itself to even field distribution by means of simple and easily applied corona shields. It is easily stackable in any position. There is flexibility because of possibility of rapid design change in the event that final circuit tests indicate higher voltage requirements. Conversely, it is easy to remove modules if reduced requirements offer savings.

To sum up, it may be said that this novel module offers simplicity, convenience, and economy combined with the well known surge current and voltage characteristics inherent in selenium rectifiers. There results therefore cost savings, long life and reliability when contrasted with tubes or other solid state devices which require considerable de-rating and safety factor.

It is believed that the construction and method of use of my improved high voltage rectifier, as well as the advantages thereof, will be apparent from the foregoing detailed description. It will also be apparent that while I have shown and described the invention in several preferred forms changes may be made in the structures shown, without departing from the scope of the invention as sought to be defined in the following claims. In the claims the reference to a short threaded stud is intended to apply to either the separate stud of FIG. 8 or the integral stud of FIG. 10.

I claim:

1. A high voltage rectifier module comprising a hollow puck-shaped insulation casing having a threaded metal insert embedded in each end, the puck being an insulation cylinder with flat circular insulation ends and having a diameter substantially greater than its height, at least one of said inserts being hollow and internally threaded and flush with the end of the casing, the other insert having a thread of like dimension, said inserts permitting said pucks to be joined in face-to-face relation, a series chain of rectifiers electrically and physically connected by bendable connections, said chain being coiled to form a helix received in said casing, one end of said chain being connected to its adjacent insert, and the other end of said chain being connected to its adjacent insert.

2. A high voltage rectifier comprising a stack of puck-shaped modules, each as defined in claim 1, and a larger diameter toroid at each end of the stack, said modules being held together by means of a short threaded stud received in an adjacent internally threaded insert, and said toroids being held by additional nuts at the ends.

3. A high voltage rectifier designed to readily replace a vacuum tube rectifier in a chassis having a vacuum tube socket for receiving the rectifier, said rectifier comprising a stack of modules, each as defined in claim 1, said modules being physically and electrically connected together by means of a short threaded stud received in the insert of an adjacent module, additional studs at the ends of the stack, a metal cap dimensioned like a vacuum tube cap secured on the stud at one end of the stack, and a pronged base dimensioned like a vacuum tube base secured to the stud at the other end of the stack.

4. A high voltage rectifier module comprising a hollow puck-shaped insulation casing having a threaded metal insert embedded in each end, the puck being an insulation cylinder with flat circular insulation ends and having a diameter substantially greater than its height, said inserts being internally threaded and flush with the ends of the casing, a series chain of rectifiers electrically and physically connected by bendable connections, said chain being coiled to form a helix received in said casing, one end of said chain being connected to its adjacent insert, and the other end of said chain being connected to its adjacent insert.

5. A high voltage rectifier module comprising a hollow puck-shaped insulation casing having a threaded metal insert embedded in each end, at least one of said inserts being internally threaded, the puck being an insulation cylinder with flat circular insulation ends and having a diameter substantially greater than its height, a series chain of rectifiers electrically and physically connected end to end by bendable connections, each of said rectifiers being a cartridge shaped unit having an insulation tube containing a series stack of thin circular selenium cells in face to back relation, a positive wire lead projecting from one end of the cartridge, and a negative wire lead projecting from the other end of the cartridge, said chain of cartridges being coiled to form a helix received in said casing, one end of said chain being connected to its adjacent insert, and the other end of said chain being connected to its adjacent insert, and potting material filling said casing around said chain of rectifiers.

6. A high voltage rectifier module comprising a hollow puck-shaped insulation casing having an internally threaded metal insert embedded in each end, the puck being an insulation cylinder with flat circular insulation ends and having a diameter substantially greater than its height, said inserts being flush with the ends of said casing, a series chain of rectifiers electrically and physically connected end to end by bendable connections, each of said rectifiers being a cartridge shaped unit having an insulation tube containing a series stack of thin circular selenium cells in face to back relation, a compression spring at one end of the cartridge to hold the cells in contact, a positive wire lead projecting from one end of the cartridge, and a negative wire lead projecting from the other end of the cartridge, said chain of cartridges being coiled to form a helix received in said casing, one end of said chain being connected to its adjacent insert, and the other end of said chain being connected to its adjacent insert, and potting material filling said casing around said chain of rectifiers.

7. A high voltage rectifier module comprising a hollow puck-shaped insulation casing having a threaded insert embedded in each end, at least one of said inserts being internally threaded, the puck being an insulation cylinder with flat circular insulation ends and having a diameter substantially greater than its height, a series chain of rectifiers electrically and physically connected end to end by bendable connections, each of said rectifiers being a cartridge shaped unit having an insulation tube containing a series stack of thin circular selenium cells in face to back relation, a compression spring at one end of the cartridge to hold the cells in contact, a positive wire lead projecting from one end of the cartridge, and a negative wire lead projecting from the other end of the cartridge, said chain of cartridges being coiled to form a helix received in said casing, one end of said chain being connected to its adjacent insert, and the other end of said chain being connected to its adjacent insert, and potting material filling said casing around said chain of rectifiers, the length of the cartridge being so related to the diameter of the coil that the exposed connections between cartridges in the successive coils of the helix are offset from one another.

8. A high voltage rectifier comprising a stack of puck-shaped modules, each as defined in claim 4, each module being physically and electrically connected to an adjacent module by means of a short threaded stud having no head and screwed into adjacent internally threaded inserts.

9. A high voltage rectifier comprising a stack of puck-shaped modules, each as defined in claim 6, each module being physically and electrically connected to an adjacent module by means of a short threaded stud having no head and screwed into adjacent internally threaded inserts.

10. A high voltage rectifier comprising a stack of puck-shaped modules, each as defined in claim 5, each module being physically and electrically connected to an adjacent module by means of a short threaded stud screwed into an adjacent internally threaded insert, the outer ends of the end modules having threaded studs receiving nuts for holding terminal wires and anti-corona hardware.

11. A high voltage rectifier comprising a stack of puck-shaped modules, each as defined in claim 7, each module being physically and electrically connected to an adjacent module by means of a short threaded stud screwed into an adjacent internally threaded insert, the outer ends of the end modules having threaded studs receiving nuts for holding terminal wires and anti-corona hardware.

12. A high voltage rectifier comprising a stack of puck-shaped modules, each as defined in claim 6, and a larger diameter toroid at each end of the stack, said modules being held together by means of a short threaded stud having no head and received in adjacent internally threaded inserts, and said toroids being held by additional nuts at the ends.

13. A high voltage rectifier comprising a stack of puck-shaped modules, each as defined in claim 5, a plurality of small metal toroids disposed between said pucks, the diameter of said toroids being larger than that of the pucks, and a larger diameter toroid at each end of the stack, said modules and toroids being held together by means of a short threaded stud received in an adjacent internally threaded insert, and nuts at the ends.

14. A high voltage rectifier comprising a stack of puck-shaped modules, each as defined in claim 7, a plurality of small metal toroids disposed between said pucks, the diameter of said toroids being larger than that of the pucks, and a larger diameter toroid at each end of the stack, said modules and toroids being held together by means of a short threaded stud received in an adjacent internally threaded insert, and nuts at the ends.

15. A high voltage rectifier designed to readily replace a vacuum tube rectifier in a chassis having a vacuum tube socket for receiving the rectifier, said rectifier comprising a stack of modules, each as defined in claim 5, said modules being physically and electrically connected together by means of a short threaded stud received in the insert of an adjacent module, additional studs at the ends of the stack, a metal cap dimensioned like a vacuum tube cap secured on the stud at one end of the stack, and a pronged base dimensioned like a vacuum tube base secured to the stud at the other end of the stack.

16. A high voltage rectifier designed to readily replace a vacuum tube rectifier in a chassis having a vacuum tube socket for receiving the rectifier, said rectifier comprising a stack of modules, each as defined in claim 6, said modules being physically and electrically connected together by means of a short threaded stud having no head and received in the inserts of adjacent modules, additional studs at the ends of the stack, a metal cap dimensioned like a vacuum tube cap secured on the stud at one end of the stack, and a pronged base dimensioned like a vacuum tube base secured to the stud at the other end of the stack.

References Cited by the Examiner
UNITED STATES PATENTS

| | | | |
|---|---|---|---|
| 2,314,104 | 3/1943 | Richards et al. | 317—234 |
| 2,423,091 | 7/1947 | Fiore | 317—234 |
| 2,459,788 | 1/1949 | Bonner | 317—234 |
| 2,766,409 | 10/1956 | Parrish | 317—234 |
| 2,786,883 | 3/1957 | Zelt | 174—127 |
| 2,984,773 | 5/1961 | Guldemond | 317—234 |

DAVID J. GALVIN, *Primary Examiner.*